(12) United States Patent
Karthik et al.

(10) Patent No.: US 7,978,791 B2
(45) Date of Patent: Jul. 12, 2011

(54) METHOD AND SYSTEM FOR ADAPTIVE CHANNEL ESTIMATION IN PILOT SYMBOL ASSISTED MODULATION SYSTEMS

(75) Inventors: Muralidhar Karthik, Karnataka (IN); Ser Wah Oh, Johor (MY)

(73) Assignee: ST-Ericsson SA, Geneva (CH)

( * ) Notice: Subject to any disclaimer, the term of this patent is extended or adjusted under 35 U.S.C. 154(b) by 1496 days.

(21) Appl. No.: 11/333,098

(22) Filed: Jan. 17, 2006

(65) Prior Publication Data
US 2006/0159204 A1 Jul. 20, 2006

(30) Foreign Application Priority Data

Jan. 20, 2005 (SG) ............................. 200500298-5

(51) Int. Cl.
*H04L 27/06* (2006.01)
(52) U.S. Cl. ........................................ 375/340; 375/316
(58) Field of Classification Search .................. 375/144, 375/340, 316; 370/319, 320, 321, 330, 335, 370/342, 345, 347; 342/150, 151, 152, 153, 342/154, 155; 333/193, 194, 195, 196
See application file for complete search history.

(56) References Cited

U.S. PATENT DOCUMENTS

| | | | | |
|---|---|---|---|---|
| 6,067,315 A | * | 5/2000 | Sandin | 370/252 |
| 6,647,003 B1 | * | 11/2003 | Abeta et al. | 370/335 |
| 7,397,842 B2 | * | 7/2008 | Bottomley et al. | 375/148 |
| 2002/0105375 A1 | * | 8/2002 | Sorokine | 329/345 |
| 2003/0114125 A1 | * | 6/2003 | Sourour et al. | 455/133 |
| 2004/0125771 A1 | * | 7/2004 | Subrahmanya | 370/332 |
| 2004/0156423 A1 | * | 8/2004 | Li et al. | 375/148 |
| 2005/0018641 A1 | * | 1/2005 | Zhao et al. | 370/342 |
| 2005/0069024 A1 | * | 3/2005 | Li et al. | 375/148 |
| 2005/0281358 A1 | * | 12/2005 | Bottomley et al. | 375/343 |

OTHER PUBLICATIONS

Marcus Benthin et al., "Influence of Channel Estimation on the Performance of a Coherent DS-CDMA System", IEEE Transactions on Vehicular Technology, vol. 46, No. 2, May 1997, pp. 262-268.
Dong Xiaojian et al., "A Frequency Domain Error Analysis for Channel Estimation with Variable Averaging Interval", 2001 IEEE, pp. 582-584.

* cited by examiner

*Primary Examiner* — Shuwang Liu
*Assistant Examiner* — Helene Tayong

(57) ABSTRACT

A method includes generating a plurality of noise-averaged channel estimates using noisy channel estimates. At least some of the noise-averaged channel estimates are generated using different averaging lengths. The method also includes selecting one of the averaging lengths based on the plurality of noise-averaged channel estimates. The step of selecting one of the averaging lengths may include subtracting the noise-averaged channel estimates from the noisy channel estimates to produce a plurality of noise-averaged differences and determining powers of the noise-averaged differences. The step of selecting one of the averaging lengths may also include determining total error powers associated with the different averaging lengths using the powers of the noise-averaged differences and selecting the averaging length corresponding to a lowest total error power.

20 Claims, 5 Drawing Sheets

METHOD AND SYSTEM FOR ADAPTIVE CHANNEL ESTIMATION IN PILOT SYMBOL ASSISTED MODULATION SYSTEMS

CROSS-REFERENCE TO RELATED APPLICATIONS

This application claims priority under 35 U.S.C. §119 to Singapore Patent Application No. 200500298-5 filed on Jan. 20, 2005, which is hereby incorporated by reference.

TECHNICAL FIELD

This disclosure relates generally to communication systems and more specifically to a method and system for adaptive channel estimation in pilot symbol assisted modulation (PSAM) systems.

BACKGROUND

In conventional radio communication systems, signals are typically transmitted between a base station (such as a radio transmission tower) and a mobile station receiver (such as a mobile telephone). The signals received by the mobile station receiver often differ from the original transmitted signal due to interference from the physical environment during signal propagation. By the time the transmitted signal is received by the mobile station receiver, the signals from different propagation paths may be associated with different phase delays.

Some conventional communication systems, such as Third Generation Partnership Project (3GPP) Universal Mobile Telecommunications System (UMTS) Terrestrial Radio Access-Frequency Division Duplex (UTRA-FDD) systems, operate using a pilot channel. The pilot channel represents a continuous modulation of a known bit sequence of a transmitted signal. Using the pilot channel, the mobile station receiver may estimate the phase of different received signals corresponding to different propagation paths before the mobile station receiver combines the different signals together.

Code Division Multiple Access (CDMA) systems are spread spectrum systems that employ radio channels with a much larger bandwidth compared to conventional frequency modulated (FM) systems. For example, a bandwidth of 1.5 MHz may be used in Interim Standard 95 (IS-95) systems, and a bandwidth of 5.0 MHz may be used in 3GPP UTRA-FDD systems. In CDMA systems, a single radio channel can simultaneously support multiple users, as opposed to FM systems that can only support one user per radio channel.

In order to differentiate information intended for different recipients transmitted over a shared radio channel in a CDMA system, each user is typically assigned a unique pseudo-noise (PN) code. Each bit in an information sequence, such as a stream of bits, to be transmitted to a particular user on a shared channel is typically multiplied with the intended recipient's PN code. The PN code is a stream of chips, where each bit of the information sequence correlates to spreading factor chips of the PN code. This technique is known as spreading and is one of many ways of transmitting a signal intended for one user over a shared channel. The signal is received by all users of the shared channel but can only be successfully decoded by the mobile station receiver containing the intended recipient's PN code. This technique of encoding data using a PN sequence is also applicable in the case of uplink communications, where a mobile station receiver sends data to a base station.

A mobile station receiver that has knowledge of a particular user's PN code is able to differentiate information sequences that are intended for that particular user from other information sequences intended for other users on the shared channel. Bits in the original transmitted information sequence are extracted from a received signal by de-correlating the PN code with the signal received by the mobile station receiver. This process of correlation is known as de-spreading.

For CDMA systems to work properly, each of the following usually needs to occur. The signals received by the mobile station receiver and the PN code used for de-spreading need to be time-aligned. Also, the auto-correlation properties of the PN codes are preferably high, meaning the correlation is high if a sequence is correlated with a zero-shifted sequence of itself and nearly zero if a sequence is correlated with a non-zero time-shifted sequence of itself. In addition, the cross-correlation properties of the PN codes are preferably near ideal, meaning nearly zero.

As such, CDMA systems may employ a pilot signal to maintain the integrity of the above conditions. The pilot signal in a CDMA system is typically a constant bit sequence that is spread using a predefined PN code, which is specific to a particular base station. Both the pilot signal bit sequence and the PN code used for its spreading remain the same for the particular base station. The pilot signal is spread and transmitted by the base station over the shared channel.

FIG. 1 illustrates a conventional rake receiver 10 in a mobile station receiver. The rake receiver 10 includes a plurality of rake fingers 12. A received input signal 11 can be considered as the sum of many multipath signals. The received input signal 11 is passed along a plurality of processing paths via the rake fingers 12 in the mobile station receiver. Each rake finger 12 is assigned to de-spread one of the many multipath signals from the received input signal 11. The output of each rake finger 12 is sent to a combiner 15. The combiner 15 combines all de-spread outputs from the rake fingers 12 and sends a combined output signal 17 for further processing. This type of rake receiver 10 may also be used in a base station or other device and is not limited to use in a mobile station receiver.

FIG. 2 illustrates a conventional rake finger 12 in the rake receiver 10 of FIG. 1. The rake finger 12 receives the input signal 11, which includes traffic signals (bits corresponding to data symbols) and pilot signals (bits corresponding to pilot symbols). In this example, the rake finger 12 includes a traffic PN code generator 22, which generates a particular unique traffic PN code. A traffic correlator 24 correlates the traffic PN code generated by the traffic PN code generator 22 with the received input signal 11. The traffic correlator 24 outputs de-spread data symbols 27. Similarly, a pilot PN code generator 21 and a pilot correlator 23 operate to produce de-spread pilot symbols 18. The number of inputs (also known as "chips") from the input signal 11 used to de-spread one output bit corresponding to a data symbol 27 or a pilot symbol 18 is known as the spreading factor (SF). The spreading factor for the data and pilot symbols can be the same or different. For the data symbols 27, permissible spreading factor values are typically 4, 8, 16, 32, 64, 128, and 256. For the pilot symbols 18, the permissible spreading factor value is typically fixed at 256.

Due to the time varying nature of a shared channel, the data and pilot symbols often undergo attenuation and phase rotation (or phase delay) by the time the symbols reach the mobile station receiver or the base station. Estimates of the attenuation and phase delay are determined in an adaptive channel estimation unit 29. For this purpose, the pilot correlator 23 outputs de-spread pilot symbols 18 to the adaptive channel estimation unit 29, and the adaptive channel estimation unit 29 outputs channel estimates 28 to a phase correction unit 25. The phase of the received signal 11 is corrected by the phase correction unit 25. The phase correction unit 25 determines the phase delay for the current portion of the received input signal 11 using the channel estimates 28 from the channel estimation unit 29. The phase correction unit 25 accordingly corrects any phase delay in the current portion of the de-spread data symbols 27 from the traffic correlator 24.

To achieve optimal performance in a wideband CDMA (W-CDMA) system, it is often important that the pilot and traffic PN codes are synchronized to the signal received by the mobile station receiver (i.e. they are kept time-aligned). A timing and control unit 26 corrects the timing and helps maintain the time alignment between the PN code generators 21-22 and the received signal 11.

The channel estimates 28 in the rake receiver 10 are often corrupted by additive white Gaussian noise (AWGN) and fading. Averaging the AWGN results in the reduction of AWGN noise power. Typically, larger averaging lengths result in better noise reduction. However, in a fading channel, if the averaging length is too long, the dynamics of the channel change and the results will deteriorate. Therefore, shorter averaging lengths typically result in better fading immunity, provided there is no deep fade occurring at that instance. A deep fade is a condition where the signal quality is too bad for any estimation purposes. Due to these two contradicting effects (AWGN and channel dynamics), the accuracy of the channel estimates 28 and a bit error rate (BER) achieved are dependent on the averaging length employed.

The optimum averaging length to obtain the channel estimates 28 is often dependent on the speed of the mobile station receiver and the signal-to-noise ratio (SNR) of the received signal 11. It therefore often becomes necessary to identify the optimum averaging length to improve the channel estimates 28 as the speed of the mobile station receiver varies.

SUMMARY

This disclosure provides a method and system for adaptive channel estimation in pilot symbol assisted modulation (PSAM) systems.

In a first embodiment, an apparatus includes a channel estimation unit for processing pilot symbols and generating noisy channel estimates. The apparatus also includes an adaptive averaging unit, which includes at least one averaging unit for averaging the noisy channel estimates to generate a plurality of noise-averaged channel estimates. At least some of the noise-averaged channel estimates are associated with different averaging lengths. The adaptive averaging unit also includes a processor capable of selecting one of the averaging lengths based on the plurality of noise-averaged channel estimates.

In particular embodiments, the at least one averaging unit includes a plurality of averaging units, where at least some of the averaging units are associated with the different averaging lengths. Also, the processor is capable of selecting one of the averaging lengths by selecting one of the averaging units.

In other particular embodiments, the adaptive averaging unit also includes at least one adder/subtractor for subtracting the noise-averaged channel estimates from the noisy channel estimates to produce a plurality of noise-averaged differences. The adaptive averaging unit further includes a power calculator for determining powers of the noise-averaged differences. The processor is further capable of determining total error powers associated with the different averaging lengths using the powers of the noise-averaged differences. The processor is capable of selecting the averaging length corresponding to a lowest total error power.

In a second embodiment, a method includes generating a plurality of noise-averaged channel estimates using noisy channel estimates. At least some of the noise-averaged channel estimates are generated using different averaging lengths. The method also includes selecting one of the averaging lengths based on the plurality of noise-averaged channel estimates.

In a third embodiment, a receiver includes a plurality of rake fingers each capable of receiving an input signal and de-spreading one of a plurality of multipath signals in the input signal. The receiver also includes a combiner capable of combining a plurality of de-spread output signals from the rake fingers. Each of at least one of the rake fingers includes a channel estimation unit and an adaptive averaging unit. The channel estimation unit is for processing pilot symbols and generating noisy channel estimates. The adaptive averaging unit includes at least one averaging unit for averaging the noisy channel estimates to generate a plurality of noise-averaged channel estimates. At least some of the noise-averaged channel estimates are associated with different averaging lengths. The adaptive averaging unit also includes a processor capable of selecting one of the averaging lengths based on the plurality of noise-averaged channel estimates.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 3 through 9, discussed below, and the various embodiments described in this disclosure are by way of illustration only and should not be construed in any way to limit the scope of the claimed invention. Those skilled in the art will understand that the principles described in this disclosure may be implemented in any suitably arranged device or system.

Figure 1:
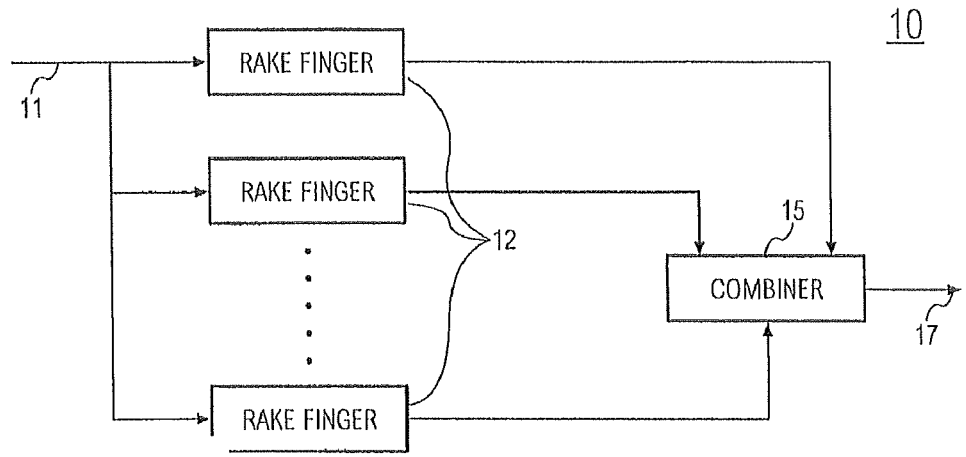
FIG. 1 illustrates a conventional rake receiver in a mobile station receiver.
Figure 2:
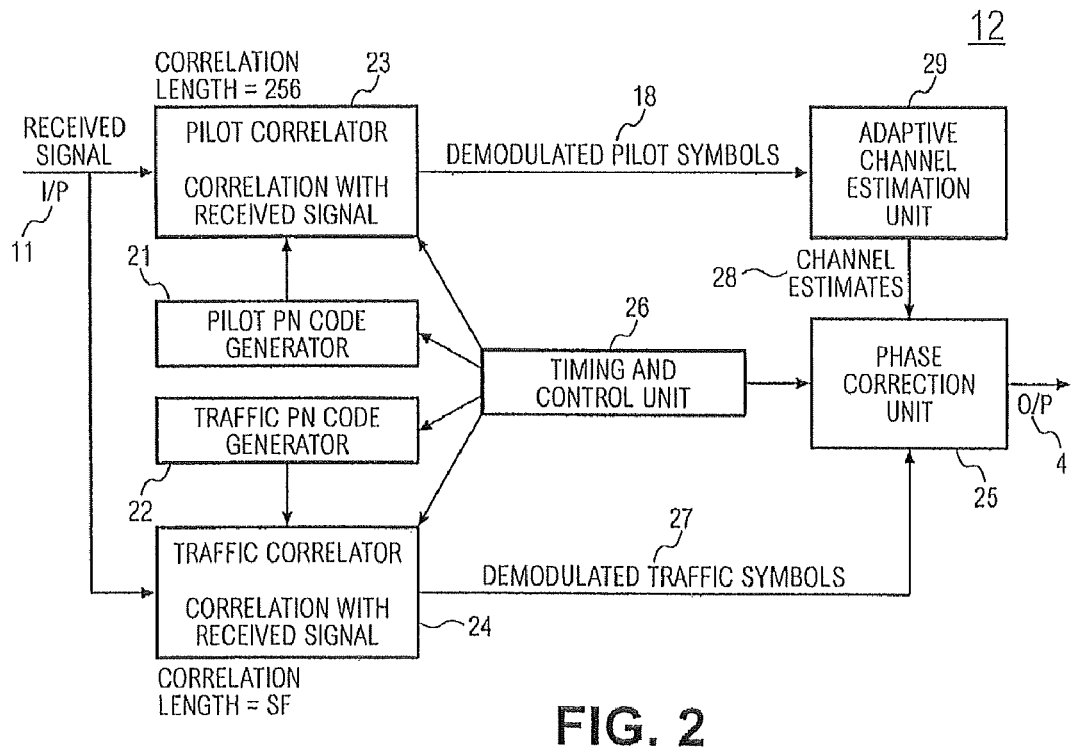
FIG. 2 illustrates a conventional rake finger in the rake receiver of FIG. 1.
Figure 3:
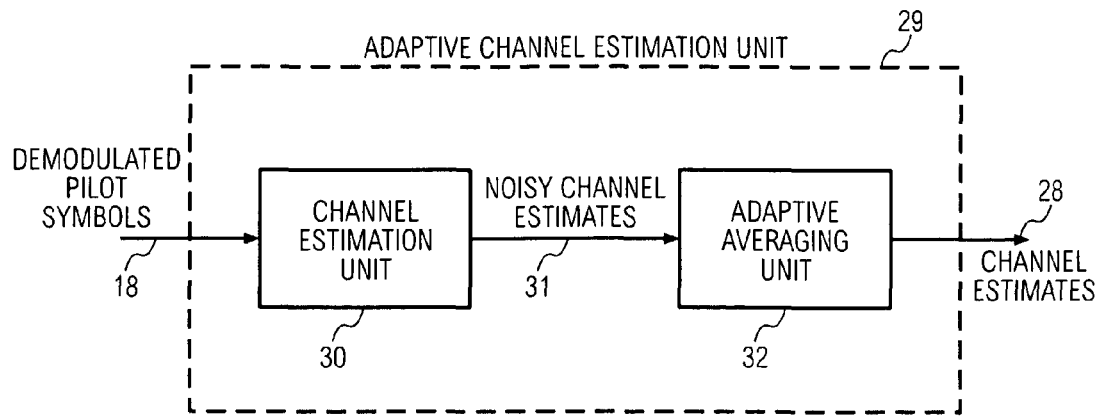
FIG. 3 illustrates an adaptive channel estimation unit for use in a rake receiver according to one embodiment of this disclosure.

FIG. 3 illustrates an adaptive channel estimation unit 29 for use in a rake receiver 10 according to one embodiment of this disclosure. The embodiment of the adaptive channel estimation unit 29 shown in FIG. 3 is for illustration only. Other embodiments of the adaptive channel estimation unit 29 could be used without departing from the scope of this disclosure. Also, the adaptive channel estimation unit 29 could be used in a rake receiver 10 within a mobile station or base station in a pilot symbol assisted modulation (PSAM) system. The adaptive channel estimation unit 29 could be used in any other suitable device and in any other suitable system.

As shown in FIG. 3, the adaptive channel estimation unit 29 includes a channel estimation unit 30 and an adaptive averaging unit 32. The adaptive channel estimation unit 29 generally provides channel estimates 28 by processing de-spread pilot symbols 18 using an optimum averaging length. More specifically, the adaptive channel estimation unit 29 calculates noisy channel estimates 31 and uses the noisy channel estimates 31 to adaptively determine the optimum averaging length. The optimum averaging length is determined by the adaptive averaging unit 32 and used to produce the channel estimates 28.

Depending on the implementation, an adaptive averaging unit 32 need not be present in all rake fingers 12 in the rake receiver 10. In some embodiments, one rake finger 12 includes the adaptive averaging unit 32 in the adaptive channel estimation unit 29. In these embodiments, the optimum averaging length found by the adaptive averaging unit 32 could be relayed to the other rake fingers 12 receiving signals from the same base station. In other embodiments, adaptive averaging units 32 may be employed in some or all of the rake fingers 12. In these embodiments, the results from the adaptive averaging units 32 could be consolidated to obtain channel estimates 28 having better performance.

In this example, the noisy channel estimates 31 include desired channel estimates (fading profile) and noise (such as additive white Gaussian noise or "AWGN") having error noise power $E_n$. The noisy channel estimates 31 are provided to the adaptive averaging unit 32, where the noise is suppressed using averaging techniques.

The averaging length used to average the noise in the adaptive averaging unit 32 is denoted L. After averaging, the error power of the averaged noise is reduced from $E_n$ to $E_n/L$. In a fading channel, however, the averaging introduces errors since the channel changes slowly over time. The error power due to the averaging often depends on the averaging length L and the speed v of the mobile station receiver. The error power due to averaging in fading channels is denoted $E_a(L,v)$. The total error power E(L) of the averaged channel estimates 28 typically includes both the error power of the averaged noise and the error power due to averaging, which may be expressed as:

$$E(L)=(E_n/L)+E_a(L,v). \tag{1}$$

The power $Power_{NCE}$ of the noisy channel estimates 31 may be given by:

$$Power_{NCE}=P+E_n \tag{2}$$

where P is the power of the channel estimates 31 uncorrupted by noise. In Equation (2), the channel may be assumed to be constant over one symbol duration, meaning $E_a(L,v)=0$.

Figure 4:
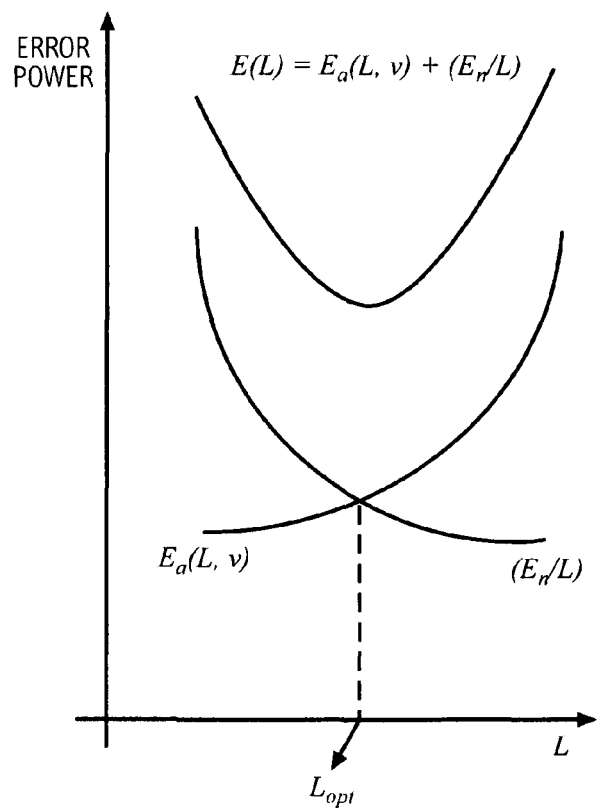
FIG. 4 illustrates a relationship between averaging length and error power according to one embodiment of this disclosure.

FIG. 4 illustrates a relationship between averaging length and error power according to one embodiment of this disclosure. As shown in FIG. 4, as the averaging length L increases, the total error power E(L) decreases until it reaches a minimum, at which point the total error power E(L) increases.

To achieve a minimum total error power E(L), an optimum averaging length $L_{opt}$ is used. $L_{opt}$ is often dependent on the speed v of the mobile station receiver. As the speed v of the mobile station receiver changes, it may become necessary to re-estimate the value of $L_{opt}$, which may be equivalent to maximizing the signal-to-noise ratio (SNR) of the channel estimates 28. The adaptive channel estimation unit 29 employs the adaptive averaging unit 32 to adaptively determine and employ the optimum averaging length $L_{opt}$ by averaging the noisy channel estimates 31.

Figure 5:
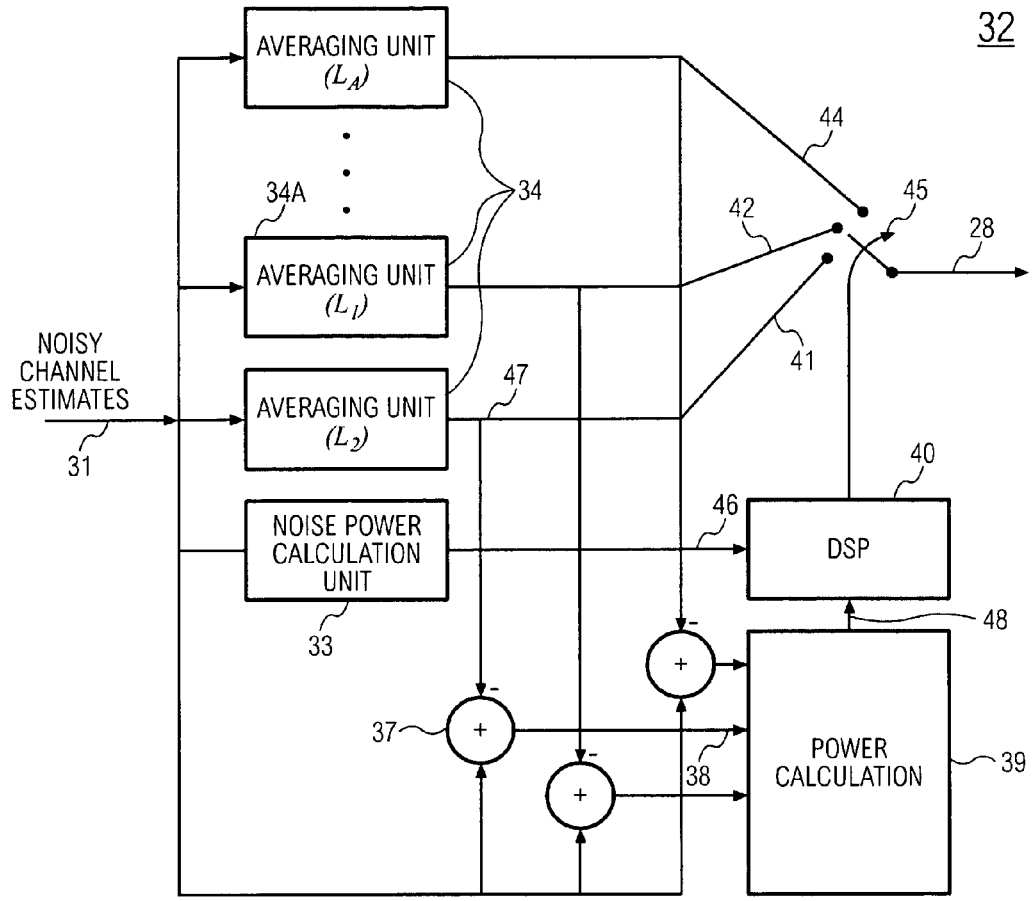
FIG. 5 illustrates an adaptive averaging unit in the adaptive channel estimation unit of FIG. 3 according to one embodiment of this disclosure.

FIG. 5 illustrates an adaptive averaging unit 32 in the adaptive channel estimation unit 29 of FIG. 3 according to one embodiment of this disclosure. The embodiment of the adaptive averaging unit 32 shown in FIG. 5 is for illustration only. Other embodiments of the adaptive averaging unit 32 could be used without departing from the scope of this disclosure. Also, the adaptive averaging unit 32 is described as operating in the adaptive channel estimation unit 29 of FIG. 3 in a rake receiver 10 of a mobile station receiver. The adaptive averaging unit 32 could be used in any other suitable device and in any suitable system.

As shown in FIG. 5, the adaptive averaging unit 32 includes a plurality of averaging units 34, a power calculation unit 39, and a processor 40 (such as a digital signal processor or "DSP"). At least some of the averaging units 34 have different averaging lengths. In particular embodiments, each averaging unit 34 has a different averaging length. The different averaging lengths of the plurality of averaging units 34 may be spread over a range of values.

In some embodiments, the plurality of averaging units 34 are for averaging the noisy channel estimates 31 according to their respective averaging lengths. Each averaging unit 34 receives the noisy channel estimates 31 from the channel estimation unit 30 and performs an averaging to obtain a noise-averaged channel estimate 47. The noise-averaged channel estimates 47 are then subtracted from the noisy channel estimates 31 via adder/subtractors 37 to obtain noise-averaged differences 38. The noise-averaged differences 38 are provided to the power calculation unit 39. The power calculation unit 39 calculates the power $Power_{NAD}$ of each noise-averaged difference 38, such as by using the following equation:

$$Power_{NAD}=E_n\{(L_x-1)/L_x)\}+E_a(L_x,v) \tag{3}$$

where $L_x$ represents the averaging length of the averaging unit 34 producing the noise-averaged channel estimate 47.

The identified power of the noise-averaged difference 38 is passed to the processor 40. Values from the plurality of averaging units 34 may be processed in a similar manner and passed to the processor 40 for processing. The processor 40 uses the calculated powers of the noise-averaged differences 38 to identify the averaging unit 34 having the lowest total error power. The averaging unit 34 having the lowest total error power may be selected as having or using the optimum averaging length. Referring to averaging unit 34A having averaging length $L_1$, the total error power could be expressed by:

$$E(L_1)=Power_{NAD}+E_n\{(2-L_1)/L_1\}. \tag{4}$$

As shown in FIG. 5, the adaptive averaging unit 32 also includes a switch 45 controlled by the processor 40. The switch 45 is used to select the output of the averaging unit 34 having the optimum averaging length. By using the switch 45, channel estimates 28 that are output by the adaptive channel estimation unit 29 may have the least amount of error from noise and from the averaging operation. The switch 45 could be implemented in any suitable way, such as by using any hardware, software, firmware, or a combination thereof.

The adaptive averaging unit 32 further includes a noise power calculation unit 33, which calculates and outputs a noise power ($E_n$) 46 of the noise (such as AWGN) in the noisy channel estimates 31. The noise power 46 may be used by the processor 40 in calculating the total error power for each of the averaging units 34.

Although each averaging unit 34 is illustrated in FIG. 5 as a separate function or unit, the averaging units 34 may be implemented using a single functional block for the entire range of averaging lengths. In these embodiments, a single adder/subtractor 37 could also be used with the single averaging unit 34, and the switch 45 could be omitted.

Figure 6:
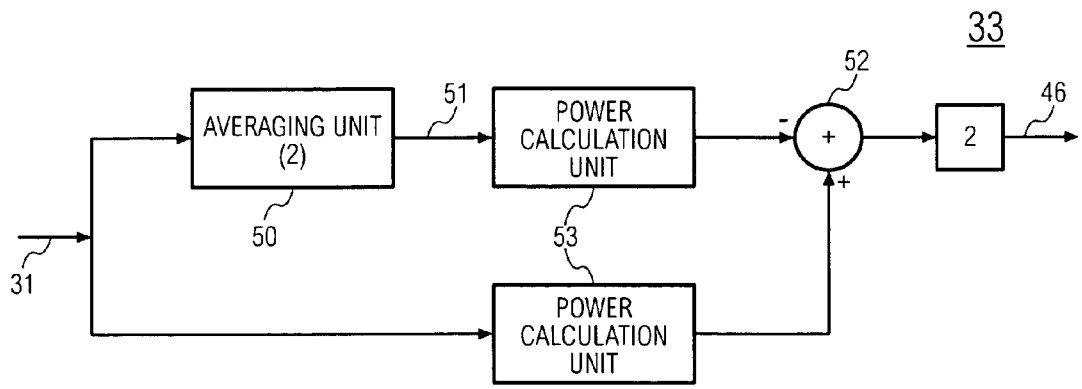
FIG. 6 illustrates a noise power calculation unit in the adaptive averaging unit of FIG. 5 according to one embodiment of this disclosure.

FIG. 6 illustrates a noise power calculation unit 33 in the adaptive averaging unit 32 of FIG. 5 according to one embodiment of this disclosure. The embodiment of the noise power calculation unit 33 shown in FIG. 6 is for illustration only. Other embodiments of the noise power calculation unit 33 could be used without departing from the scope of this disclosure.

As shown in FIG. 6, the noise power calculation unit 33 includes a fixed position averaging unit 50 and two power calculation units 53. The noisy channel estimates 31 are received by the fixed position averaging unit 50, where the noisy channel estimates 31 undergo averaging to obtain a noise fixed average estimate 51. The power $Power_{NFAE}$ of the noise fixed average estimate 51 may be expressed as:

$$Power_{NFAE}=P+(E_n/2)+E_a(2,v)\approx P+(E_n/2) \quad (5)$$

where the averaging length of the fixed position averaging unit 50 equals two. The approximation in Equation (5) may hold true as $E_a(2,v)\sim 0$, even at high speeds (such as speeds up to v=300 km/hr).

The noise fixed average estimate 51 is provided to one of the power calculation units 53, which calculates the power of the noise fixed average estimate 51. The power of the noisy fixed average estimate 51 is then subtracted from the power of the noisy channel estimates 31 (which is calculated by the other power calculation unit 53) via an adder/subtractor 52. The resulting difference is multiplied by a factor of two, resulting in the noise power ($E_n$) 46 of the noisy channel estimates 31. The noise power 46 could be expressed as:

$$E_n=(Power_{NCE}-Power_{NFAE})*2. \quad (6)$$

While described above as being formed from various components, the adaptive channel estimation unit 29, the adaptive averaging unit 32, the noise power calculation unit 33, or other devices or components described in this document could be implemented in any hardware, software, firmware, or combination thereof. In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Figure 7:
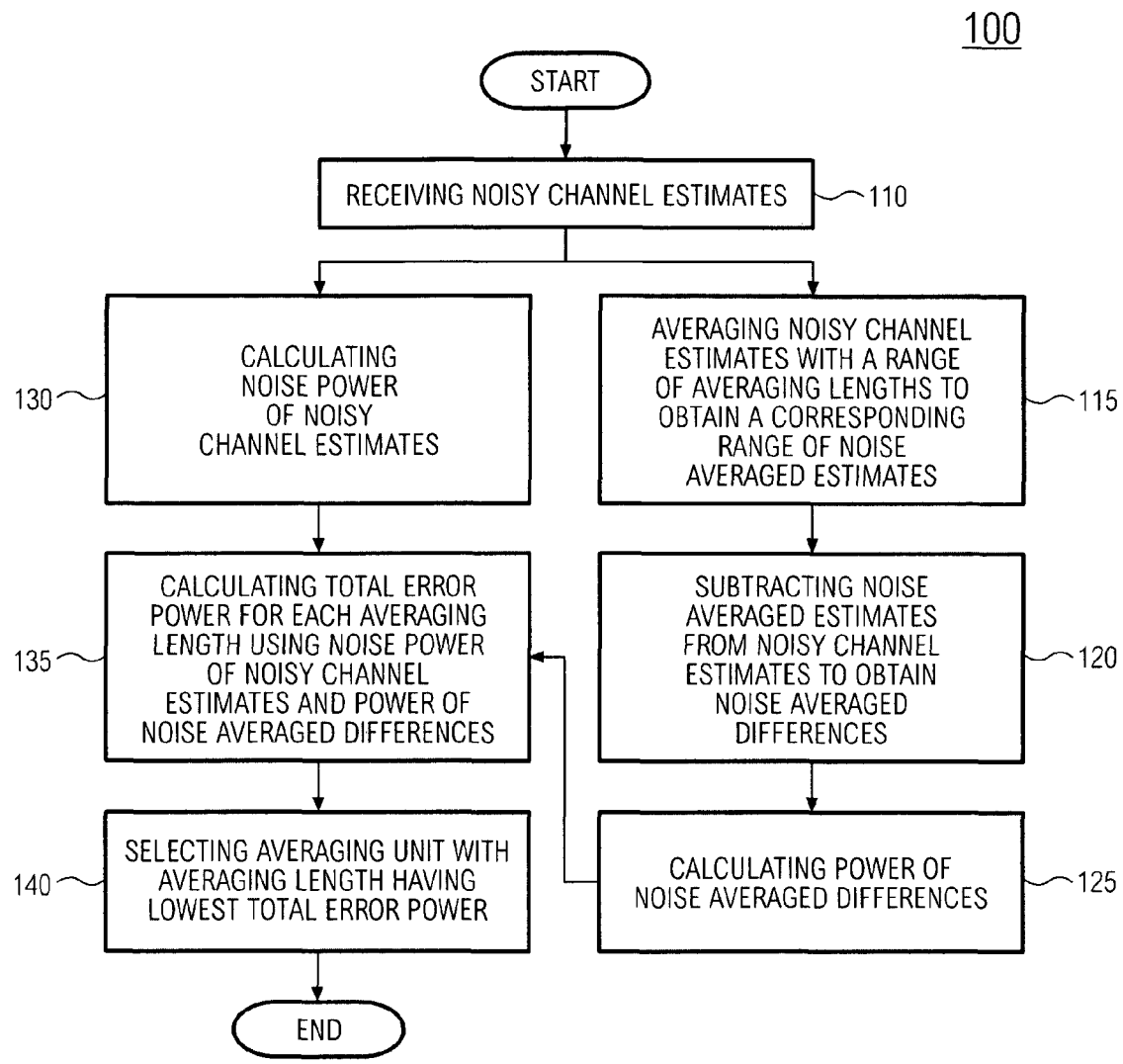
FIG. 7 illustrates a method for adaptive channel estimation according to one embodiment of this disclosure.

FIG. 7 illustrates a method 100 for adaptive channel estimation according to one embodiment of this disclosure. For ease of explanation, the method 100 is described with respect to the various components shown in FIGS. 1-3, 5, and 6. The method 100 could be used by any other suitable device and in any other suitable system.

In this example, the method 100 begins with receiving the noisy channel estimates 31 at the adaptive averaging unit 32 at step 110. The noisy channel estimates 31 are averaged using a plurality of averaging lengths to obtain a corresponding plurality of noise-averaged estimates 47 at step 115. The noise-averaged estimates 47 are subtracted from the noisy channel estimates 31 to obtain noise-averaged differences 38 at step 120. The powers of the noise-averaged differences 38 are calculated in the power calculation unit 39 at step 125.

The noise power of the noisy channel estimates 31 is determined at step 130. The total error power for each of the averaging lengths is determined using the noise power of the noisy channel estimates 31 and the powers of the noise-averaged differences 38 at step 135. The averaging unit 34 with the averaging length having the lowest total error power is selected by the processor 40 as the averaging unit 34 for generating the channel estimates 28 at step 140.

In some embodiments, the method 100 is performed in a mobile station receiver. Since the speed of the mobile station receiver may be varying constantly, the method 100 could be performed at fixed or other intervals or in any other suitable manner to continually provide an estimate of the new optimum averaging length. In particular embodiments, the speed of the mobile station receiver may not vary drastically, and the frequency of performing the method 100 need not be high (such as every 0.1 second to every 1 second).

As shown in FIG. 7, various ones of the steps in the method 100 may occur in parallel or overlap. However, the steps shown in FIG. 7 could occur in any suitable serial and/or parallel manner.

Figure 8:
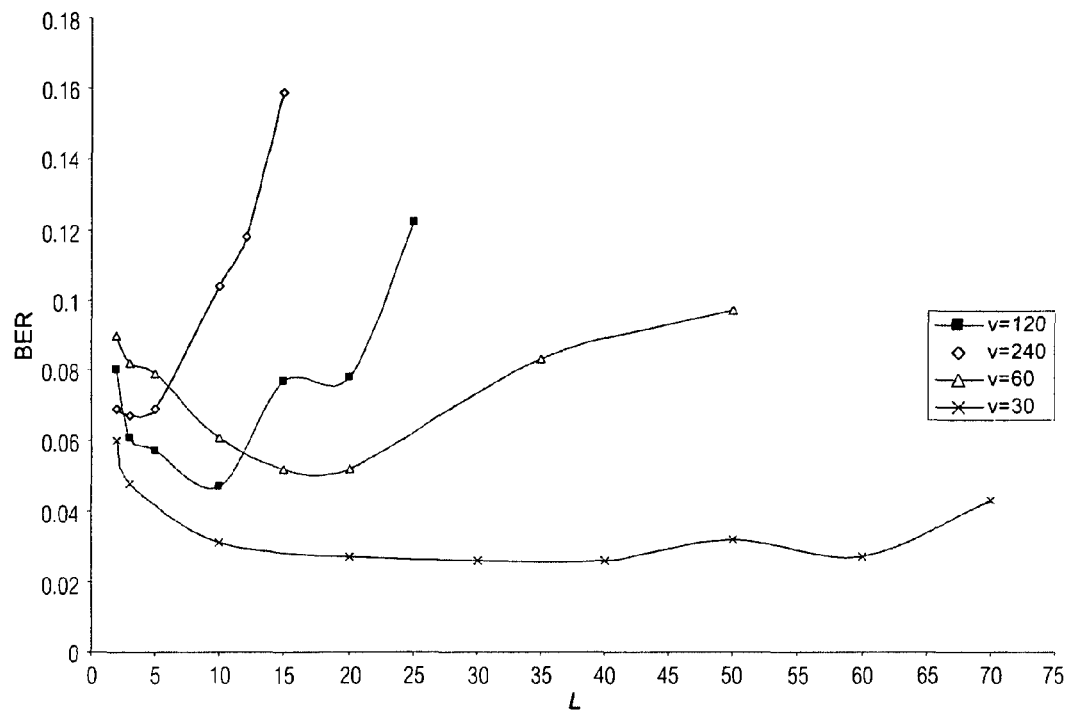
FIG. 8 illustrates simulation results involving bit error rate and averaging length according to one embodiment of this disclosure.

FIG. 8 illustrates simulation results involving bit error rate and averaging length according to one embodiment of this disclosure. In this example, simulations were performed using the adaptive channel estimation unit 29 of FIG. 3. A propagation channel was set up to simulate Rayleigh fading with three multipaths. The relative powers of the multipaths were all equal to 0 dB. Their relative delays were 0 chips, 3.75 chips, and 15 chips (where a chip period is 260 μs). The method 100 was applied on the strongest path. FIG. 8 contains a graph of the bit error rate (BER) plotted against the averaging length L at various speeds v. A total of 1,000 bits were tested. The following can be observed in FIG. 8. There is an optimum averaging length $L_{opt}$ at which the BER is at a minimum, and the optimum averaging length $L_{opt}$ is dependent on the speed v of the mobile station receiver.

Figure 9:
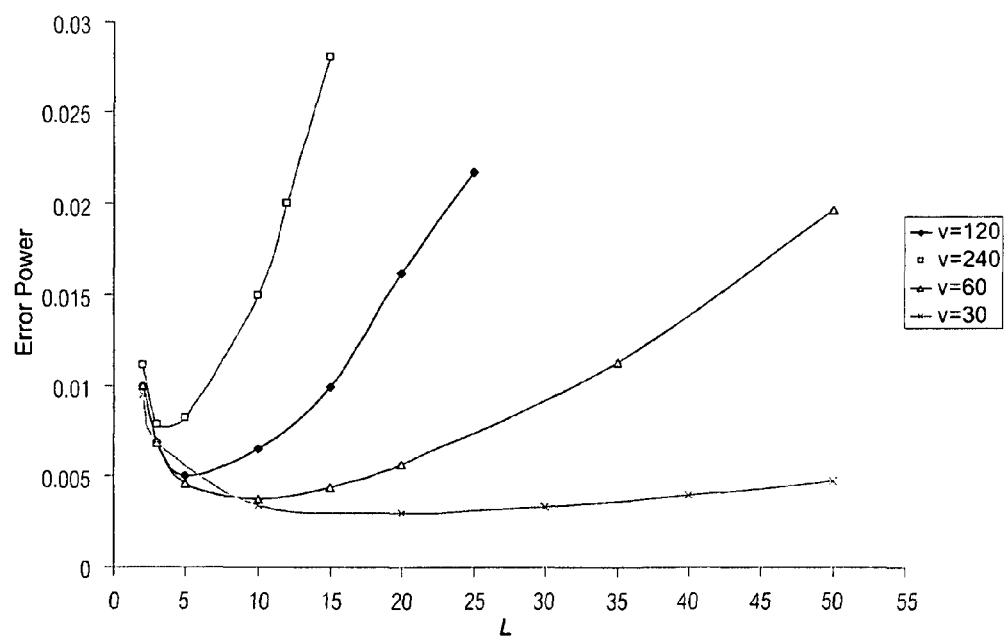
FIG. 9 illustrates simulation results involving total error power and averaging length according to one embodiment of this disclosure.

FIG. 9 illustrates simulation results involving total error power and averaging length according to one embodiment of this disclosure. In particular, FIG. 9 contains a graph of the total error power plotted against the averaging length L at various speeds v. The following can be observed in FIG. 9. The total error power decreases with increasing averaging lengths L, reaches a minimum, and then increases. The optimum averaging length $L_{opt}$ at which the total error power reaches its minimum is dependent on the speed v of the mobile station receiver and SNR.

From FIG. 9, the optimum averaging length $L_{opt}$ at which the total error power is a minimum can be estimated. Denote this estimated optimum averaging length as $L'_{opt}$. The actual value of the optimum averaging length $L_{opt}$ can be deduced from FIG. 8 (at the location where the BER is a minimum). Using this technique, the actual and estimated values of the optimum averaging length may be compared as shown in Table 1.

TABLE 1

| No. | Speed (v) | Actual Optimum Averaging Length ($L_{opt}$) | Estimated Optimum Averaging Length ($L'_{opt}$) |
| --- | --- | --- | --- |
| 1 | 30 | 20–40 | 20 |
| 2 | 60 | 10–20 | 10 |
| 3 | 120 | 5–10 | 5 |
| 4 | 240 | 2–5 | 3 |

The following can be observed from Table 1. The estimated optimum averaging length ($L'_{opt}$) is approximately equal to the true value ($L_{opt}$). Also, as the speed changes, the true and estimated optimum values change accordingly.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "controller" and "processor" mean any device, system, or part thereof that controls or performs at least one operation. A controller or processor may be implemented in hardware, firmware, software, or some combination of at least two of the same. The functionality associated with any particular controller or processor may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a channel estimation unit configured to process pilot symbols and generate noisy channel estimates; and
an adaptive averaging unit comprising:
a plurality of averaging units configured to average the noisy channel estimates to generate a plurality of noise-averaged channel estimates, at least some of the noise-averaged channel estimates associated with different averaging lengths; and
a processor capable of selecting one of the averaging lengths based on the plurality of noise-averaged channel estimates by selecting one of the averaging units at least one adder/subtractor configured to subtract the noise-averaged channel estimates from the noisy channel estimates to produce a plurality of noise-averaged differences, and
a power calculator configured to determine powers of the noise-averaged differences, the processor is further capable of determining total error powers associated with the different averaging lengths using the powers of the noise-averaged differences and the processor is capable of selecting the averaging length corresponding to a lowest total error power.

2. The apparatus of claim 1, wherein:
the adaptive averaging unit further comprises a noise power calculator configured to determine a noise power of the noisy channel estimates; and
the processor is capable of using the noise power of the noisy channel estimates to determine the total error powers.

3. The apparatus of claim 2, wherein the noise power calculator comprises:
an averaging unit configured to average the noisy channel estimates to produce an average estimate; and
at least one power calculator configured to determine a power of the average estimate and a power of the noisy channel estimates;
wherein the noise power is based on the power of the average estimate and the power of the noisy channel estimates.

4. The apparatus of claim 3, wherein the noise power is determined by subtracting the power of the average estimate from the power of the noisy channel estimates to obtain a difference and multiplying the difference by two.

5. The apparatus of claim 1, wherein the adaptive averaging unit further comprises:
a switch configured to selectively output the noise-averaged channel estimates corresponding to the selected averaging length.

6. The apparatus of claim 5, wherein the switch is controlled by the processor.

7. The apparatus of claim 1, wherein:
the adaptive averaging unit further comprises a noise power calculator configured to determine a noise power of the noisy channel estimates.

8. The apparatus of claim 7, wherein the processor is capable of using the noise power of the noisy channel estimates to determine the total error powers and an averaging unit configured to average the noisy channel estimates to produce an average estimate.

9. The apparatus of claim 8, wherein at least one power calculator configured to determine a power of the average estimate and a power of the noisy channel estimates.

10. The apparatus of claim 9, wherein the noise power is based on the power of the average estimate and the power of the noisy channel estimates.

11. A method, comprising:
generating, by an adaptive averaging unit, a plurality of noise-averaged channel estimates using noisy channel estimates, at least some of the noise-averaged channel estimates generated using different averaging lengths by subtracting the noise-averaged channel estimates from the noisy channel estimates to produce a plurality of noise-averaged differences, determining powers of the noise-averaged differences, and determining total error powers associated with the different averaging lengths using the powers of the noise-averaged differences; and
selecting one of the averaging lengths based on the plurality of noise-averaged channel estimates corresponding to a lowest total error power.

12. The method of claim 11, further comprising determining a noise power of the noisy channel estimates;
wherein determining the total error powers comprises determining the total error powers using the noise power of the noisy channel estimates.

13. The method of claim 12, wherein determining the noise power comprises:
averaging the noisy channel estimates to produce an average estimate; and
determining a power of the average estimate and a power of the noisy channel estimates;
wherein the noise power is based on the power of the average estimate and the power of the noisy channel estimates.

14. The method of claim 13, wherein the noise power is determined by subtracting the power of the average estimate from the power of the noisy channel estimates to obtain a difference and multiplying the difference by two.

15. The method of claim 11, further comprising:
causing a switch to selectively output the noise-averaged channel estimates corresponding to the selected averaging length.

16. The method of claim 12, wherein determining the noise power comprises:
averaging the noisy channel estimates to produce an average estimate.

17. The method of claim 16, wherein determining the noise power comprises:
determining a power of the average estimate and a power of the noisy channel estimates.

18. A receiver, comprising:
a plurality of rake fingers each capable of receiving an input signal and de-spreading one of a plurality of multipath signals in the input signal; and
a combiner capable of combining a plurality of de-spread output signals from the rake fingers;
wherein each of at least one of the rake fingers comprises:
a channel estimation unit configured to process pilot symbols and generating noisy channel estimates; and
an adaptive averaging unit comprising:
at least one averaging unit configured to average the noisy channel estimates to generate a plurality of noise-averaged channel estimates, at least some of the noise-averaged channel estimates associated with different averaging lengths;
a processor capable of selecting one of the averaging lengths based on the plurality of noise-averaged channel estimates;
at least one adder/subtractor configured to subtract the noise-averaged channel estimates from the noisy channel estimates to produce a plurality of noise-averaged differences; and
a power calculator configured to determine powers of the noise-averaged differences wherein the processor is further capable of determining total error powers associated with the different averaging lengths using the powers of the noise-averaged differences; and
the processor is capable of selecting the averaging length corresponding to a lowest total error power.

19. The receiver of claim 18, wherein:
the adaptive averaging unit further comprises a noise power calculator to determine a noise power of the noisy channel estimates; and
the processor is capable of using the noise power of the noisy channel estimates to determine the total error powers.

20. The receiver of claim 18, wherein:
the adaptive averaging unit further comprises a noise power calculator to determine a noise power of the noisy channel estimates.

* * * * *